US011084207B2

(12) United States Patent
Chimmalgi et al.

(10) Patent No.: US 11,084,207 B2
(45) Date of Patent: Aug. 10, 2021

(54) WINDOW VARIABILITY CORRECTION IN ADDITIVE MANUFACTURING

(71) Applicant: Carbon, Inc., Redwood City, CA (US)

(72) Inventors: Anant Chimmalgi, Los Altos, CA (US); Jiayao Zhang, Mountain View, CA (US); James Michael Ian Bennett, San Francisco, CA (US); Bob E. Feller, San Mateo, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 16/490,262

(22) PCT Filed: Oct. 19, 2018

(86) PCT No.: PCT/US2018/056668
§ 371 (c)(1),
(2) Date: Aug. 30, 2019

(87) PCT Pub. No.: WO2019/083833
PCT Pub. Date: May 2, 2019

(65) Prior Publication Data
US 2020/0070406 A1 Mar. 5, 2020

Related U.S. Application Data

(60) Provisional application No. 62/575,804, filed on Oct. 23, 2017.

(51) Int. Cl.
*B29C 64/124* (2017.01)
*B33Y 10/00* (2015.01)
(Continued)

(52) U.S. Cl.
CPC ............ *B29C 64/124* (2017.08); *B33Y 10/00* (2014.12); *B29C 64/40* (2017.08);
(Continued)

(58) Field of Classification Search
None
See application file for complete search history.

(56) References Cited

U.S. PATENT DOCUMENTS

| 5,545,367 A | 8/1996 | Bae et al. |
| 2002/0041369 A1* | 4/2002 | Boettiger ............ G03F 7/70483 |
| | | 250/492.2 |

(Continued)

FOREIGN PATENT DOCUMENTS

| CN | 106346775 | 1/2017 |
| WO | 2015/164234 | 10/2015 |

(Continued)

OTHER PUBLICATIONS

International Search Report and Written Opinion for PCT/US2019/062762 dated Feb. 20, 2020, 14 pages.

(Continued)

*Primary Examiner* — Matthew J Daniels
*Assistant Examiner* — Paul Spiel
(74) *Attorney, Agent, or Firm* — Myers Bigel, P.A.

(57) ABSTRACT

A method of making an object on a bottom-up stereolithography apparatus is provided. The apparatus includes a light source (11), a drive assembly (14), and a controller (15) operatively associated with the light source and the drive assembly, with the light source and/or the drive assembly having at least one adjustable parameter that is adjustable by the controller. The method includes installing a removable window cassette (12) on the apparatus in a configuration through which the light source projects, the window cassette comprising an optically transparent member, provided as a window (12a), having a build surface on which an object can be produced, and with the optically transparent member having and at least one variable property therein; and then modifying the at least one adjustable parameter by the controller based on the at least one variable optical property (Continued)

of the window; and then producing the object on the build surface from a light-polymerizable liquid by bottom-up stereolithography.

24 Claims, 4 Drawing Sheets

(51) Int. Cl.
*B33Y 30/00* (2015.01)
*B29C 64/40* (2017.01)
*B33Y 50/02* (2015.01)

(52) U.S. Cl.
CPC ....... *B29K 2995/0065* (2013.01); *B33Y 30/00* (2014.12); *B33Y 50/02* (2014.12)

(56) References Cited

U.S. PATENT DOCUMENTS

| 2018/0134029 | A1  | 5/2018  | Myerberg et al. |
| 2018/0370136 | A1* | 12/2018 | Stadlmann ............ B29C 64/259 |
| 2019/0091930 | A1* | 3/2019  | Chen ..................... B29C 64/393 |
| 2020/0171746 | A1* | 6/2020  | Schmidt ................ B29C 64/321 |

FOREIGN PATENT DOCUMENTS

| WO | 2017/079774 | 5/2017 |
| WO | 2017/154564 | 9/2017 |

OTHER PUBLICATIONS

International Search Report and Written Opinion for PCT/US2018/056668 dated Jan. 25, 2019, 12 pages.

\* cited by examiner

WINDOW VARIABILITY CORRECTION IN ADDITIVE MANUFACTURING

RELATED APPLICATIONS

This application is a 35 U.S.C. § 371 national phase entry of International Application No. PCT/US2018/056668, filed Oct. 19, 2018, which claims priority to U.S. Provisional Application Ser. No. 62/575,804, filed Oct. 23, 2017, the disclosures of which are incorporated by reference herein in its entirety their entireties.

FIELD OF THE INVENTION

The present invention concerns additive manufacturing, particularly stereolithography, including continuous liquid interface production (CLIP).

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin ont the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (published online 16 Mar. 2015); see also Rolland et al., U.S. Pat. Nos. 9,676,963, 9,453,142 and 9,598,606).

With the increased speed and versatility of bottom-up stereolithography techniques, the windows employed in such apparatus have become more complex, and the potential for defects in such window to cause defects in the objects produced thereon has become problematic. Where windows are in the form of interchangeable "cassettes" that can be switched between apparatus, even optical variations that could otherwise be accommodated can disrupt the production process. Accordingly, there is a need for new techniques to address the problem of window optical defects and variability.

SUMMARY OF THE INVENTION

In some embodiments according to the present invention, a method of making an object on a bottom-up stereolithography apparatus is provided. The apparatus includes a light source, a drive assembly, and a controller operatively associated with the light source and the drive assembly, with the light source and/or the drive assembly having at least one adjustable parameter that is adjustable by the controller. The method includes (a) installing a removable window cassette on the apparatus in a configuration through which the light source projects, the window cassette comprising an optically transparent member having a build surface on which an object can be produced, and with the optically transparent member having and at least one variable property therein; and then (b) modifying the at least one adjustable parameter by the controller based on the at least one variable optical property of the window; and then (c) producing the object on the build surface from a light-polymerizable liquid by bottom-up stereolithography.

In some embodiments, the window cassette includes a unique identifier (e.g., a bar code, QR code, NFC tag, etc.) operatively associated therewith, and the modifying step is carried out by: (i) detecting the unique identifier (e.g., with a unique identifier reader), and then (ii) transferring (e.g., over the internet) optical correction instructions for the at least one variable optical property and corresponding to the unique identifier from a data storage media (e.g., a cloud database) to the controller.

In some embodiments, the window cassette includes a data storage media thereon (e.g., a flash drive), and the data storage media contains optical correction instructions for the at least one variable optical property; and the modifying step is carried out by: (i) operatively associating the storage media with the controller (e.g., through a USB interface) and then (ii) transferring the optical correction instructions from the data storage media to the controller.

In some embodiments, the variable property comprises an optical property, a physical property (e.g., permeability to an inhibitor of polymerization), or a combination thereof.

In some embodiments, the variable property comprises window thickness or window height (mechanical location of the top of the window when mounted on the apparatus), and the adjustable parameter comprises projected image magnification (for the entirety of an image and/or portions thereof) and/or light source focal plane.

In some embodiments, the variable property comprises window light transmissiveness (e.g., one or more discrete blemishes; a tansmissiveness gradient; etc.) and the adjustable property comprises light intensity (e.g., greater intensity in regions with less light transmissiveness).

In some embodiments, the variable property comprises an optical defect region, and the adjustable parameter comprises a projection region to the build surface (e.g., an excluded region or "no print zone" for production of an object on that build surface).

In some embodiments, the variable property comprises regional optical distortions in the window, and the adjustable parameter comprises regional optical corrections of the projected light image that are mapped to the regional optical distortions.

In some embodiments, the variabile property comprises permeability to an inhibitor of polymerization (e.g., oxygen), and the adjustable parameter comprises light intensity, speed of production, or a combination thereof.

In some embodiments, each adjustable parameter is independently applied to one or more minor portions of the window, a major portion of the window, or the entirety of the window, or a combination thereof.

In some embodiments, the optically transparent member comprises a plurality of distinct layers.

In some embodiments, the optically transparent member comprises: (i) a rigid or flexible, semi-permeable or impermeable, support member; (ii) either a semipermeable member on the support member (e.g., a fluoropolymer member) or an immiscible layer (e.g., a hydrogel) on the support member; (iii) an inhibitor of polymerization (e.g., oxygen) in the semipermeable member when present; (iii) optionally but preferably, a cushioning member between the impermeable support member and the semipermeable member; and (v) optionally but preferably, feed space (e.g., feed channels) between the impermeable support member and the semipermeable member (e.g., in or on the cushioning member), the feed space configured for supplying additional inhibitor of polymerization (e.g., oxygen) into the semipermeable member.

In some embodiments, the modifying step enhances at least one performance characteristic of the apparatus (e.g., by reducing the frequency of production failures thereon, such as by enhancing accuracy of object production thereon, reducing defect formation in objects produced thereon, etc., including combinations thereof).

In some embodiments, the producing step is carried out by continuous liquid interface production (CLIP).

In some embodiments, a bottom-up stereolithography apparatus includes (a) a light source, (b) a drive assembly, (c) a controller operatively associated with the light source and the drive assembly, with the light source and/or the drive assembly having at least one adjustable parameter that is adjustable by the controller, (d) an engagement assembly operatively associated with the light source and configured for securing a removable window cassette on the apparatus in a configuration through which the light source projects, the window cassette comprising an optically transparent member having a build surface on which an object can be produced, and with the optically transparent member having and at least one variable property, and (e) either (i) a unique identifier reader (e.g., an NFC tag reader) operatively associated with the controller and configured for reading a unique identifier on the window cassette, or (ii) a data storage media coupling (e.g., a USB coupling) operatively associated with the controller and configured for coupling to a data storage media on the window cassette.

In some embodiments, the controller is configured to carry out the methods described herein.

In some embodiments, a window cassette useful for removably mounting on a bottom-up stereolithography apparatus includes: (a) a circumferential frame; (b) an optically transparent member connected to the circumferential frame, the optically transparent member having a build surface on which an object can be produced, and with the optically transparent member having and at least one variable property therein; and (c) either a unique identifier (e.g., an NFC tag) or a data storage media (e.g., a flash memory) connected to the circumferential frame.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
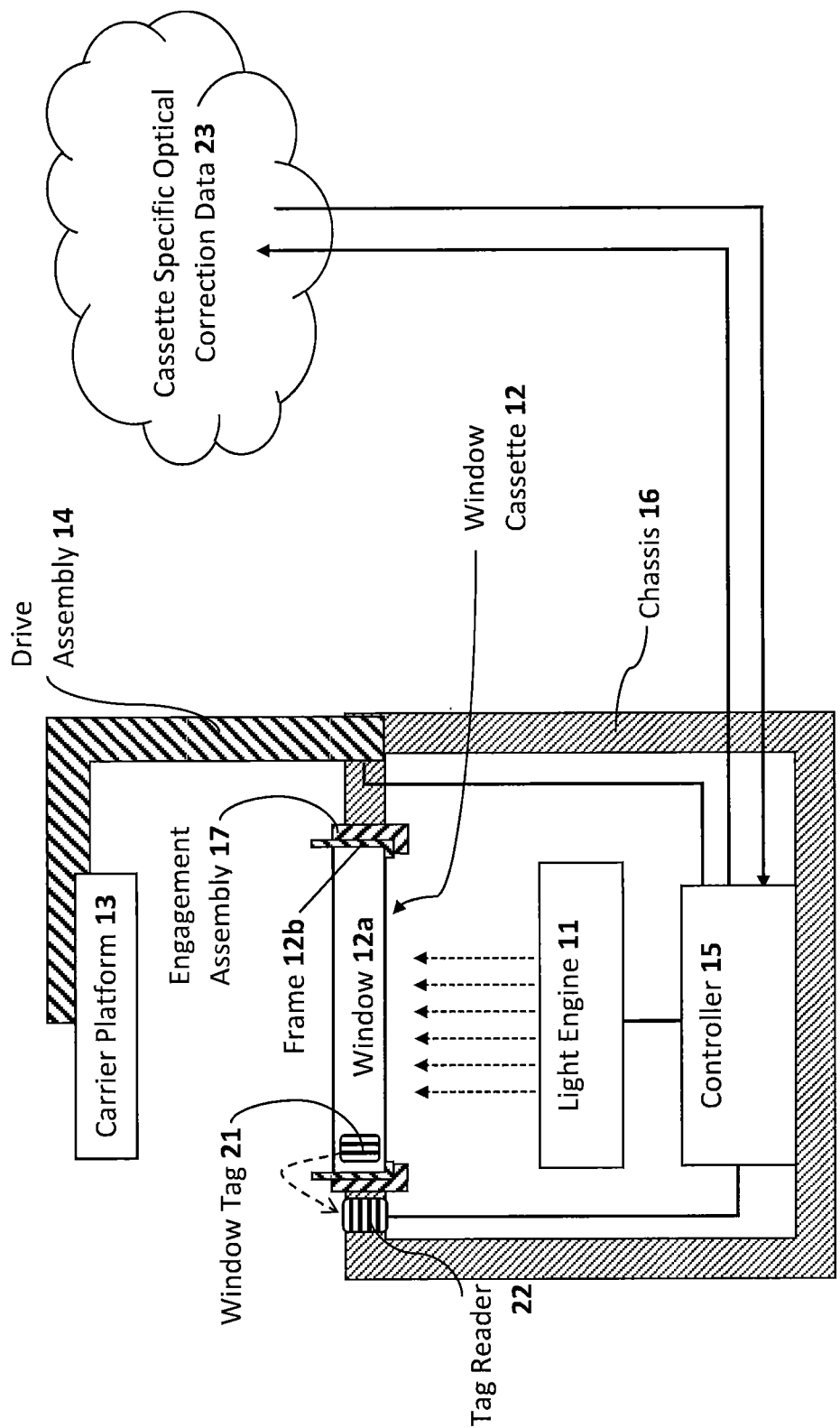
FIG. 1 schematically illustrates a first embodiment of the present invention, in which optical correction instructions are transferred from a cloud database to a controller over the internet.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

"Unique identifier" and "unique identifier reader" as used herein refer to components of an automatic identification and data capture system. Suitable unique identifiers include, but are not limited to, bar codes (including one-dimensional and two-dimensional bar codes (QR codes)), near field communication (NFC) tags, radio frequency identification (RFID) tags (including active, passive, and battery-assisted passive RFID tags), optical character recognition (OCR) tags and readers, magnetic strips and readers, etc. A variety of such systems are known and described in, for example, U.S. Pat. Nos. 8,120,468; 8,526,910; 9,373,201; 9,562,429; 9,576,476; 9,587,487; 9,589,428; and 9,595,058. Such unique identifiers can be mounted on a container for resins for distribution from a resin provider to an end user, as discussed further below.

"Information storage media" as used herein may be any of the same devices described above in connection with "unique identifier," except used to store resin characteristics or modified operating instructions, as opposed to a resin unique identity, as discussed below.

1. Additive Manufacturing Methods and Apparatus.

Additive manufacturing apparatus and methods are known. Suitable apparatus includes bottom-up apparatus that employ a window, or optically transparent member or "build plate," on which a pool of polymerizable liquid sits, and through which patterned light is projected to produce a three-dimensional object. Such methods and apparatus are known and described in, for example, U.S. Pat. No. 5,236, 637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El- Siblani, U.S. Patent Application Publication Nos. 2013/0292862 to Joyce, and US Patent Application Publication No. 2013/0295212 to Chen et al. The disclosures of these patents and applications are incorporated by reference herein in their entirety.

CLIP is known and described in, for example, U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three dimensional fabrication as described above, but the the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. The inhibitor may pass entirely through the semipermeable member, or a "pool" of inhibitor may reside within the semipermeable member and pass through the resin contact surface thereof, as described in DeSimone et al. (referenced above), and also in Sun et al., US Patent Application Publication No. US 2016/0288376. While a preferred inhibitor is oxygen, other inhibitors, such as bases (including amines) as described in DeSimone et al., or those described in Sun et al., may also be used. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016). Additional examples of stereolithography or "CLIP" processes to which embodiments of the invention may be applied include. U.S. Patent Application Publication Nos. 2016/0067921, published Mar. 10, 2016, and 2018/0243976, published Aug. 30, 2018.

The apparatus can include a local controller that contains and executes operating instructions for the production of a three dimensional object on that apparatus, typically from an object data file entered into the controller by the user. Along with the basic three-dimensional image of the object that is typically projected for photopolymerization (along with movement of the carrier and build surface away from one another in the Z direction), the operating instructions can include or generate process parameters such as: light intensity; light exposure duration; inter-exposure duration; speed of production; step height; height and/or duration of upstroke in a stepped or reciprocal operating mode; height and/or duration of downstroke in a reciprocal operating mode; rotation speed for pumping viscous polymerizable liquid; resin heating temperature; and/or resin cooling temperature; rotation speed and frequency, etc. (see, e.g., Ermoshkin et al., Three-dimensional printing with reciprocal feeding of polymerizable liquid PCT Patent Application Pub. No. WO 2015/195924 (published 23 Dec. 2015); Sutter et al., Fabrication of three dimensional objects with multiple operating modes, PCT Patent Application Publication No. WO 2016/140886 (published 9 Sep. 2016); J. DeSimone et al., Methods and apparatus for continuous liquid interface production with rotation, PCT Patent Application WO 2016/007495 (published 14 Jan. 2016); see also J. DeSimone et al., U.S. Pat. No. 9,211,678, and J. Batchelder et al., Continuous liquid interface production system with viscosity pump, US Patent Application Publication No. US 2017/0129169 (published 11 May 2017).

In one non-limiting embodiment, the apparatus may be a Carbon Inc., M1 or M2 additive manufacturing apparatus, available from Carbon, Inc., 1089 Mills Way, Redwood City, Calif. 94063 USA.

2. Build Plates and Window Cassettes

While the present invention is in a preferred embodiment envisioned for window cassettes used to carry out CLIP, it is applicable to any bottom-up stereolithography process for which a window may benefit from optical correction, whether that window is formed from a single layer of optically transparent material, or from multiple layers of optically transparent materials formed of different materials.

In some embodiments, a window cassette useful for removably mounting on a bottom-up stereolithography apparatus includes: (a) a circumferential frame; (b) an optically transparent member connected to the circumferential frame, the optically transparent member having a build surface on which an object can be produced, and with the optically transparent member having and at least one variable property therein; and (c) either a unique identifier (e.g., an NFC tag) or a data storage media (e.g., a flash memory) connected to the circumferential frame. The optically transparent member may include a plurality of distinct layers. In some embodiments, the optically transparent member comprises: (i) a rigid or flexible, semi-permeable or impermeable, support member; (ii) either a semipermeable member on the support member (e.g., a fluoropolymer member) or an immiscible layer (e.g., a hydrogel) on the support member; (iii) an inhibitor of polymerization (e.g., oxygen) in the semipermeable member when present; (iii) optionally but preferably, a cushioning member between the impermeable support member and the semipermeable member; and (v) optionally but preferably, feed space (e.g., feed channels) between the impermeable support member and the semipermeable member (e.g., in or on the cushioning member), the feed space configured for supplying additional inhibitor of polymerization (e.g., oxygen) into the semipermeable member.

Examples of windows that can be used to carry out the present invention include, but are not limited to, those described in:

U.S. Pat. No. 9,498,920 to J. DeSimone, A. Ermoshkin, and E. Samulski; U.S. Pat. No. 9,360,757 to J. DeSimone, A. Ermoshkin, N. Ermoshkin and E. Samulski; and U.S. Pat. No. 9,205,601 to J. DeSimone, A. Ermoshkin, N. Ermoshkin and E. Samulski;

US Patent Application Publication Nos. US 2016/0046075 to J. DeSimone, A. Ermoshkin et al.; US 2016/0193786 to D. Moore, A. Ermoshkin et al.; US 2016/

0200052 to D. Moore, J. Tumbleston et al.; and US 2016/0288376 to Sun and Lichkus;

PCT Patent Application Publication Nos. 2016/123499 to D. Moore, J. Tumbleston et al; WO 2016/123506 to D. Moore, J. Tumbleston et al.; WO 2016/149097 to J. Tumbleston, E. Samulski et al.; WO 2016/149014 to J. Tumbleston, E. Samulski et al.; WO 2016/172783 to R. Fortier and D. Castanon; WO 2016/172788 to R. Fortier and D. Castanon; WO 2016/172804 to R. Fortier and D. Castanon; WO 2016/172805 to R. Fortier and D. Castanon; and WO 2015/164234 to L. Robeson, E. Samulski et al.; and others (the disclosures of all of which are incorporated by reference herein in their entirety).

3. Example Apparatus and Methods

Figure 2:
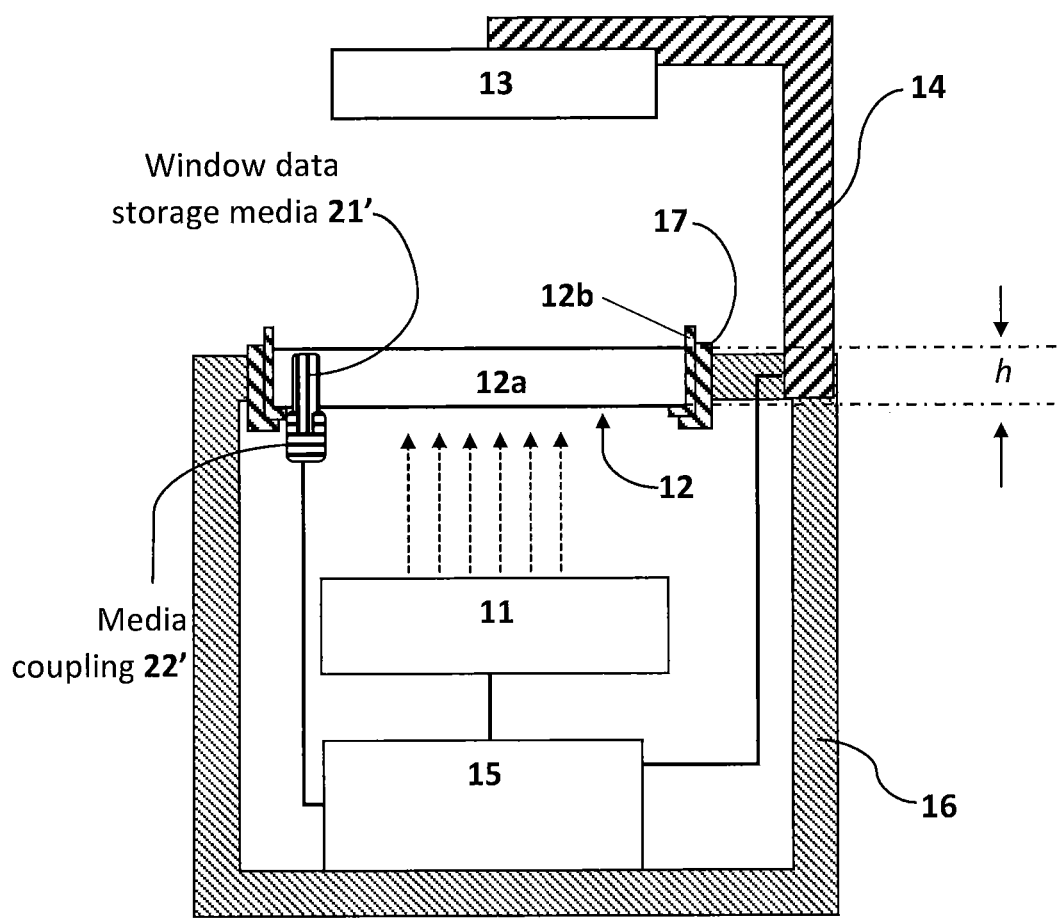
FIG. 2 schematically illustrates a second embodiment of the present invention, in which optical correction instructions are transferred from a storage media associated with the window cassette to a controller via a local connection.

Examples of apparatus useful for carrying out the present invention are given in FIGS. 1-2. In each case, the apparatus includes a light engine 11 operatively associated with a removable window cassette 12, along with a (typically also removable) carrier platform 13 on a drive assembly 14. All are operatively associated with a chassis 16. A controller 15 (which may be included "on-board" the chassis, or separately) is operatively associated with the drive assembly and light engine. The window cassette is typically mounted to the apparatus frame by means of an engagement or alignment assembly 17.

The window cassette 12 typically includes an optically transparent window 12a (which may be comprised of multiple layers as described above) and a window frame 12b. The apparatus engagement assembly 17 is configured to releasably secure the window frame 12b in an aligned configuration with the light engine 11.

In the embodiment of FIG. 1, the controller is operatively associated with a window unique identifier (or "tag") reader 22, which is positioned on the apparatus in a configuration to read from a window unique identifier or "tag") 21 that is connected to the window cassette 12. The reader is operatively associated with the controller 12, which is in turn configured to transmit that unique identifier to a database (such as a cloud database 23) via the internet and receive cassette-specific optical correction instructions from that database, so that appropriate correction can be made locally, as discussed below.

In the embodiment of FIG. 2, the window cassette further comprises a window data storage media 21', and the apparatus includes a media coupling 22'. The storage media includes cassette-specific optical correction instructions. When secured to the apparatus, the storage media couples to the coupling 22', which in turn is operatively associated with controller 15, and which is in turn configured to download and receive cassette-specific optical correction instructions so that appropriate correction can be made locally, as discussed below.

While non-limiting examples of system architectures are given in FIGS. 1-2, it will be appreciated that any of a variety of different architectures can be employed. Controllers can be a general purpose computer dedicated to, or on board, a particular apparatus; a local general purpose computer operatively associated with a group of machines via a local area network (or metropolitan area network); a remote general purpose computer operatively associated with machines via a wide area network or internet connection; and combinations thereof (for example, organized in a client-server architecture and/or distributed architecture). Likewise, data storage or memory can be on separate (volatile and/or non-volatile) memory devices located locally or remotely, partitioned sections of a single memory device, etc., including combinations thereof (e.g., a remote back-up memory in addition to a local memory). Peripheral devices for data entry and display can be implemented in any of a variety of ways known in the art, including typical keypad entry, video display, and printing apparatus, as well as graphical user interfaces such as touch-pads, touch-screens and the like, including smart-phone touch screens.

Figure 3A:
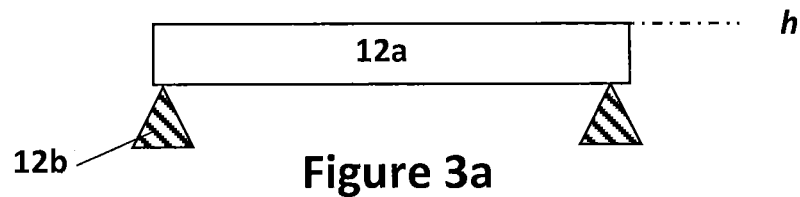
FIG. 3a is a side sectional, schematic, view of a window cassette, in which the height of the window is uniform.

A first set of example window optical properties for which optical correction instructions may be generated are given in FIGS. 3a-3d, and concern window height. In the embodiment of FIG. 3a, window height h is substantially uniform across the window cassette. For this situation, no window-specific instructions may be required, unless the height is greater or less than expected (as compared to an average or "standard" window. If the height is less than expected (and the window is hence closer to the light engine than expected, then the magnification of the projected light image may be increased. If the height is greater than expected, then the magnification of the projected light image can be increased.

Figure 3B:
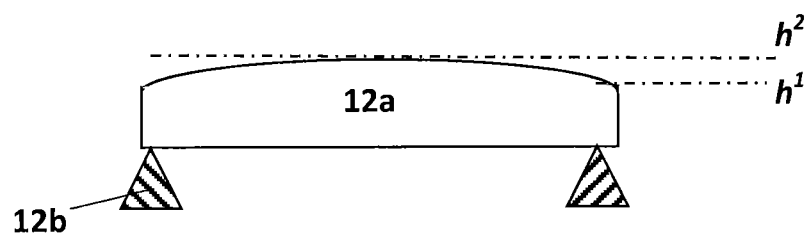
FIG. 3b is a side sectional, schematic, view of a window cassette, in which the height of the window is non-uniform due to window curvature.

In the embodiment of FIG. 3b, window height $h^1$ is lower in peripheral regions than in a central region $h^2$, and correction instructions as described in connection with FIG. 3a are required for those different regions.

Figure 3C:
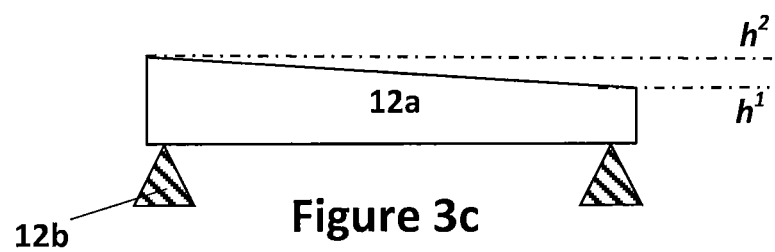
FIG. 3c is a side sectional, schematic, view of a window cassette, in which the height of the window is non-uniform due to thickness differences in the window.

In the embodiment of FIG. 3c, window height varies across the window due to a slant in the window, and correction instructions as described above are required for the regions of different height.

Figure 3D:
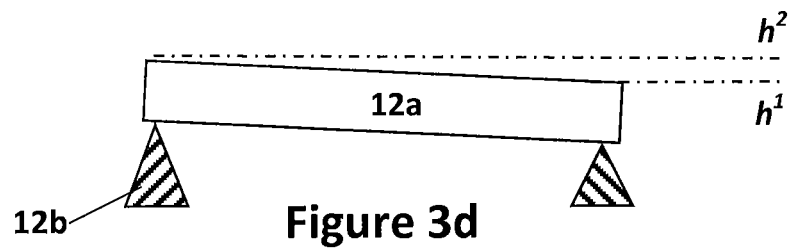
FIG. 3d is a side sectional, schematic, view of a window cassette, in which the height of the window is non-uniform due to height irregularities in the frame in which the window is mounted.

In the embodiment of FIG. 3d, window height varies across the window due to an irregularity in the window frame, and correction instructions as described above re required for the window regions consequently of different height.

Figure 4A:
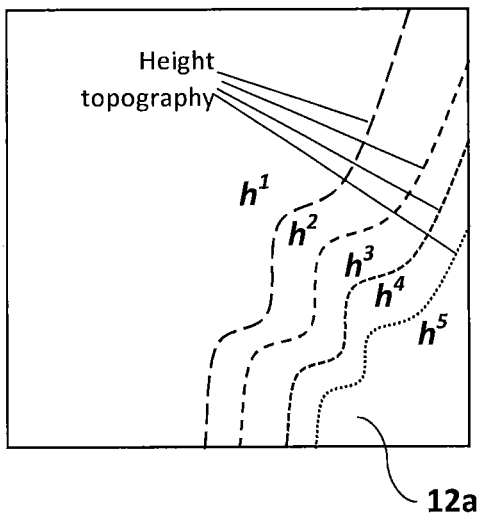
FIG. 4a is a top plan view of a window in which the height topography varies across five regions, from lowest ($h^1$) to highest ($h^5$).

Note that, while in FIGS. 3b-3d, two heights are given, for which corresponding correction instructions may be given, there may be three, four, five or more different height regions, as indicated by heights $h^1$, $h^2$, $h^3$, $h^4$, $h^5$ in the embodiment of FIG. 4a. Here, the corrective instructions may include decreased magnification of the projected light image for window regions that are further from the light engine, or increased magnification for regions that are closer to the light engine.

Figure 4B:
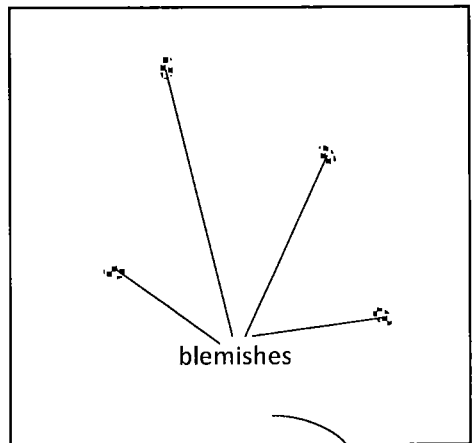
FIG. 4b is a top plan view of a window contains discrete regions of lesser transmissiveness (i.e., "blemishes").
Figure 4C:
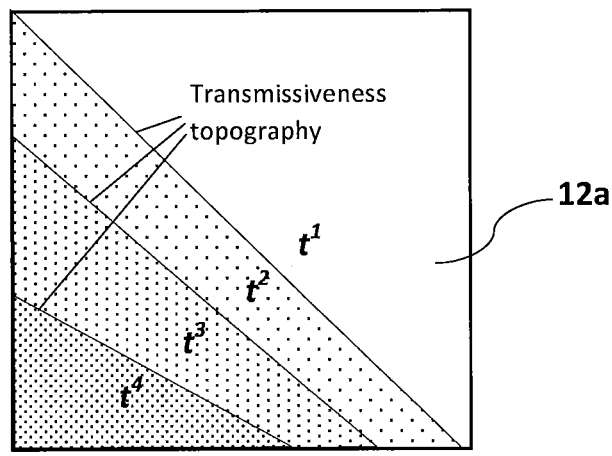
FIG. 4c is a top plan view of a window in which the transmissiveness topography varies across four regions, from most transmissive ($t^1$) to least transmissive ($t^4$).

FIG. 4b schematically represents a window with a plurality of discrete regions of lesser light transmissiveness relative to surrounding regions of the window (i.e., blemishes), and FIG. 4c represents a window with a progressive gradient of decreasing light transmissiveness, from $t^1$ through $t^2$, $t^3$ to $t^4$. Again, the corrective instructions may include increased light intensity for regions of lesser light transmissiveness.

Figure 4D:
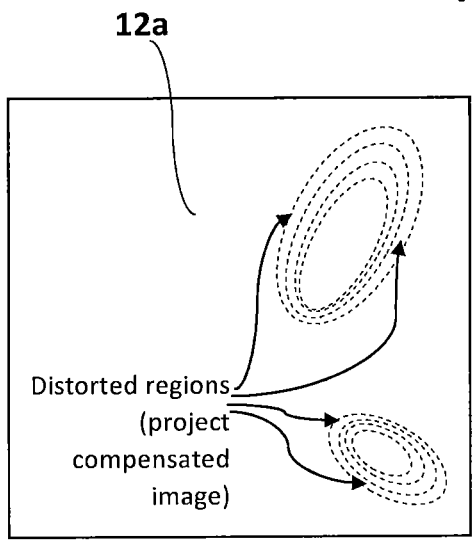
FIG. 4d is a top plan view of a window containing two optical distortion regions (that is, regions in which an image projected therethrough a distorted, as compared to the remaining regions of the window).

FIG. 4d schematically represents a window with regions that distort an optical image. Here, the correction instructions can include corresponding or reciprocal distortions of the projected image that are mapped to the distorted region(s) so that the image reaching the build region through the distorted region(s) is correct.

Figure 4E:
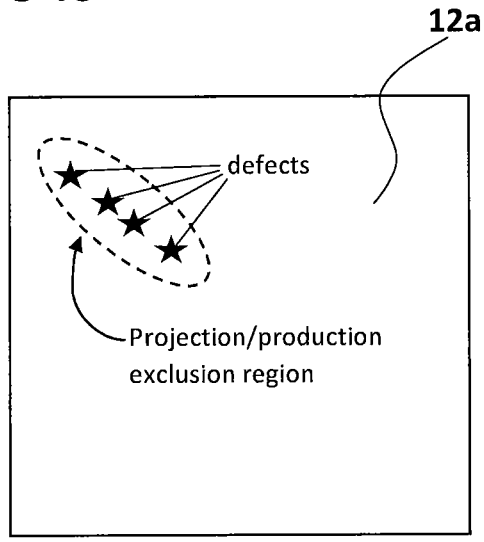
FIG. 4e is a top plan view of a window containing four defects, rendering the region of the window in which the defects are located unsuitable for the production of at least some objects (or at least some portions of some objects).

FIG. 4e schematically represents a window with regions that are so blemished, or so distorted, that any projected image through those regions would still result in unacceptable defects within objects produced therein (at least, within the tolerances specified for the particular objects being produced). Here, the corrective instructions may simply be defining an exclusion region, on which no objects are produced, or through which no light is projected, with images for objects being produced projecting elsewhere on the window (for example, where multiple objects are produced concurrently, they can be automatically arranged by the controller in a manner that does not utilize the exclusion region for projection).

Similar corrections can be made when the window is one that is semipermeable to an inhibitor of polymerization (e.g., oxygen), and the variable property is permeability, particularly reduced permeability, to that inhibitor. For example, when permeability (in a discrete region of the window, in a gradient across the window or in the entirety of the window) is less than expected (e.g., as compared to prior windows, an average of prior windows, or an actual or arbitrary standard window), then light intensity projected from the light engine can be reduced, speed of production (as carried out by the drive assembly) can be reduced, or a combination thereof. If permeability in some regions is too low to feasibly produce objects therein, then an exclusion region (like that described in connection with FIG. 4e above) can be created.

The foregoing is illustrative of the present invention, and is not to be construed as limiting thereof. The invention is defined by the following claims, with equivalents of the claims to be included therein.

We claim:

1. A method of making an object on a bottom-up stereolithography apparatus, the apparatus including a light source, a drive assembly, and a controller operatively associated with said light source and said drive assembly, with the light source and/or the drive assembly having at least one adjustable parameter that is adjustable by said controller, the method comprising: (a) installing a removable window cassette on said apparatus in a configuration through which said light source projects, said window cassette comprising an optically transparent member having a build surface on which an object can be produced, and with said optically transparent member having at least one variable property therein; and then (b) modifying said at least one adjustable parameter by said controller based on said at least one variable property of said window cassette, wherein said at least one adjustable parameter comprises a parameter of the light source, drive assembly, or a combination thereof and wherein said at least one variable property further comprises permeability to an inhibitor of polymerization, and said adjustable parameter comprises light intensity, speed of production, or a combination thereof, and then (c) producing the object on said build surface from a light-polymerizable liquid by bottom-up stereolithography, wherein: said window cassette includes a unique identifier operatively associated therewith, and said modifying step is carried out by: (i) detecting said unique identifier, and then (ii) transferring optical correction instructions for said at least one variable property and corresponding to said unique identifier from a data storage media to said controller.

2. The method of claim 1, wherein said at least one variable property comprises an optical property, a physical property, or a combination thereof.

3. The method of claim 1, wherein said window cassette comprises a window and said at least one variable property comprises window thickness or window height, and said adjustable parameter comprises projected image magnification and/or light source focal plane.

4. The method of claim 1, wherein said window cassette comprises a window and said at least one variable property comprises window light transmissiveness and said at least one adjustable parameter comprises light intensity.

5. The method of claim 1, wherein said at least one variable property comprises an optical defect region, and said adjustable parameter comprises a projection region to said build surface.

6. The method of claim 1, wherein said at least one variable property comprises regional optical distortions in said window cassette, and said adjustable parameter comprises regional optical corrections of the projected light image that are mapped to said regional optical distortions.

7. The method of claim 1, wherein each said adjustable parameter is independently applied to one or more minor portions of said window cassette, a major portion of said window cassette, or the entirety of said window cassette, or a combination thereof.

8. The method of claim 1, wherein said optically transparent member comprises a plurality of distinct layers.

9. The method of claim 1, wherein said optically transparent member comprises: (i) a rigid or flexible, semipermeable or impermeable, support member; (ii) either a semipermeable member on said support member or an immiscible layer on said support member; (iii) an inhibitor of polymerization in said semipermeable member when present; (iv) optionally a cushioning member between said impermeable support member and said semipermeable member; and (v) optionally feed space between said impermeable support member and said semipermeable member, said feed space configured for supplying additional inhibitor of polymerization into said semipermeable member.

10. The method of claim 1, wherein said modifying step enhances at least one performance characteristic of said apparatus.

11. The method of claim 1, wherein said producing step is carried out by continuous liquid interface production (CLIP).

12. The method of claim 5, wherein said adjustable parameter comprises an excluded region or no print zone for production of an object on said build surface.

13. A method of making an object on a bottom-up stereolithography apparatus, the apparatus including a light source, a drive assembly, and a controller operatively associated with said light source and said drive assembly, with the light source and/or the drive assembly having at least one adjustable parameter that is adjustable by said controller, the method comprising: (a) installing a removable window cassette on said apparatus in a configuration through which said light source projects, said window cassette comprising an optically transparent member having a build surface on which an object can be produced, and with said optically transparent member having at least one variable property therein; and then (b) modifying said at least one adjustable parameter by said controller based on said at least one variable property of said window cassette, wherein said at least one adjustable parameter comprises a parameter of the light source, drive assembly, or a combination thereof and wherein said at least one variable property further comprises permeability to an inhibitor of polymerization, and said adjustable parameter comprises light intensity, speed of production, or a combination thereof, and then (c) producing the object on said build surface from a light-polymerizable liquid by bottom-up stereolithography, wherein said window cassette includes a data storage media thereon, said data storage media containing optical correction instructions for said at least one variable property; and said modifying step is carried out by: (i) operatively associating said storage media with said controller and then (ii) transferring said optical correction instructions from said data storage media to said controller.

14. The method of claim 13, wherein said at least one variable property comprises an optical property, a physical property, or a combination thereof.

15. The method of claim 13, wherein said window cassette comprises a window and said at least one variable property comprises window thickness or window height, and said adjustable parameter comprises projected image magnification and/or light source focal plane.

16. The method of claim 13, wherein said window cassette comprises a window and said at least one variable property comprises window light transmissiveness and said at least one adjustable parameter comprises light intensity.

17. The method of claim 13, wherein said at least one variable property comprises an optical defect region, and said adjustable parameter comprises a projection region to said build surface.

18. The method of claim 13, wherein said at least one variable property comprises regional optical distortions in said window cassette, and said adjustable parameter comprises regional optical corrections of the projected light image that are mapped to said regional optical distortions.

19. The method of claim 13, wherein each said adjustable parameter is independently applied to one or more minor portions of said window cassette, a major portion of said window cassette, or the entirety of said window cassette, or a combination thereof.

20. The method of claim 13, wherein said optically transparent member comprises a plurality of distinct layers.

21. The method of claim 13, wherein said optically transparent member comprises: (i) a rigid or flexible, semipermeable or impermeable, support member; (ii) either a semipermeable member on said support member or an immiscible layer on said support member; (iii) an inhibitor of polymerization in said semipermeable member when present; (iv) optionally a cushioning member between said impermeable support member and said semipermeable member; and (v) optionally feed space between said impermeable support member and said semipermeable member, said feed space configured for supplying additional inhibitor of polymerization into said semipermeable member.

22. The method of claim 13, wherein said modifying step enhances at least one performance characteristic of said apparatus.

23. The method of claim 13, wherein said producing step is carried out by continuous liquid interface production (CLIP).

24. The method of claim 17, wherein said adjustable parameter comprises an excluded region or no print zone for production of an object on said build surface.

* * * * *